(12) United States Patent
Zhang et al.

(10) Patent No.: US 11,739,896 B2
(45) Date of Patent: Aug. 29, 2023

(54) BATTERY BOX

(71) Applicants: Xiaofeng Zhang, Zhejiang (CN); Heng Kao, Taipei (TW)

(72) Inventors: Xiaofeng Zhang, Zhejiang (CN); Heng Kao, Taipei (TW)

( * ) Notice: Subject to any disclaimer, the term of this patent is extended or adjusted under 35 U.S.C. 154(b) by 39 days.

(21) Appl. No.: 17/611,903

(22) PCT Filed: Aug. 23, 2019

(86) PCT No.: PCT/CN2019/102109
§ 371 (c)(1),
(2) Date: Nov. 16, 2021

(87) PCT Pub. No.: WO2021/017056
PCT Pub. Date: Feb. 4, 2021

(65) Prior Publication Data
US 2022/0228718 A1    Jul. 21, 2022

(30) Foreign Application Priority Data
Jul. 30, 2019  (CN) .......................... 201921214115.5

(51) Int. Cl.
*F21S 9/02*    (2006.01)
*F21S 4/10*    (2016.01)
(Continued)

(52) U.S. Cl.
CPC . *F21S 9/02* (2013.01); *F21S 4/10* (2016.01); *H01M 50/284* (2021.01); *F21Y 2115/10* (2016.08)

(58) Field of Classification Search
CPC ........ F21S 4/00; F21S 4/10; F21S 9/02; F21L 4/06; F21Y 2115/10; H01M 50/284;
(Continued)

(56) References Cited

U.S. PATENT DOCUMENTS

| 10,145,520 B1* | 12/2018 | Tang | .................... F21V 21/0824 |
| 2019/0069649 A1* | 3/2019 | Qin | ........................ F21V 23/001 |
| 2021/0036275 A1* | 2/2021 | Anderson | ................. F21S 9/02 |

FOREIGN PATENT DOCUMENTS

| CN | 206846400 | 1/2018 |
| CN | 107726099 | 2/2018 |

(Continued)

OTHER PUBLICATIONS

English Translation WO 2019/095457. May 23, 2019, Ding (Year: 2019).*

(Continued)

*Primary Examiner* — Peggy A Neils
(74) *Attorney, Agent, or Firm* — JCIP Global Inc.

(57) ABSTRACT

A battery box, including a box body and an LED lamp string. A circuit board mounting groove and a battery placement groove are disposed in the box body, a power supply source is disposed in the battery placement groove, and a circuit board and a cover plate are disposed in the circuit board mounting groove. A power source terminal seat is disposed at one side of the circuit board, at least two terminal plugholes are disposed in the power source terminal seat, a through-line hole is disposed on a side wall of each of the terminal plugholes facing the box body, a collosol groove is between the through-line hole and the power source terminal seat, power source plug terminals are disposed at one end of the LED lamp string, and the power source plug terminals are correspondingly inserted into the terminal plugholes respectively.

9 Claims, 11 Drawing Sheets

(51) Int. Cl.
*H01M 50/284* (2021.01)
*F21Y 115/10* (2016.01)

(58) Field of Classification Search
CPC ......... H01M 2220/30; H01M 10/4257; H01M 10/488; H01M 50/247; H01M 50/291; H01M 50/296; H01M 50/213
See application file for complete search history.

(56) References Cited

FOREIGN PATENT DOCUMENTS

| | | | |
|---|---|---|---|
| CN | 207364727 | | 5/2018 |
| CN | 108644744 | | 10/2018 |
| CN | 208422999 | | 1/2019 |
| CN | 208779410 | | 4/2019 |
| WO | WO 2019095457 | * | 5/2019 |

OTHER PUBLICATIONS

English Translation, CN 206846400, Jan. 5, 2018, Zhang (Year: 2018).*
"International Search Report (Form PCT/ISA/210) of PCT/CN2019/102109," dated Mar. 2, 2020, with English translation thereof, pp. 1-5.
"Written Opinion of the International Searching Authority (Form PCT/ISA/237) of PCT/CN2019/102109," dated Mar. 2, 2020, pp. 1-4.

* cited by examiner

BATTERY BOX

CROSS-REFERENCE TO RELATED APPLICATION

This application is a 371 of international application of PCT application serial no. PCT/CN2019/102109, filed on Aug. 23, 2019, which claims the priority benefit of China application no. 201921214115.5, filed on Jul. 30, 2019. The entirety of each of the above-mentioned patent applications is hereby incorporated by reference herein and made a part of this specification.

TECHNICAL FIELD

The present invention belongs to the technical field of LED lamp strings and in particular, relates to a battery box.

DESCRIPTION OF RELATED ART

An LED lamp string is generally composed by connecting several LED bulbs to a wire and is capable of providing a favorable decoration effect upon arranging a scene and thus has been popularized into the daily life of people. With lots of demands for the LED lamp string, especially the LED lamp string used for powering a combined battery box, the production of the LED lamp string is easier relative to production of a plug-in LED lamp string and its use is more convenient, thus enabling its application in a large number.

However, in an actual production process, it is generally necessary to complete an electrical connection and a stable fixing for the LED lamp string and the battery box. The working procedure is a required working procedure for production of a battery lamp string. The working procedure can only be completed with welding of a leading wire. The leading wire of the LED lamp string is welded to the battery box, and a connection of the LED bulb in the LED lamp string to the wire has been completed by an automatic welding machine to form a lamp string bar. The LED lamp string bar needs to complete an electrical connection to the battery box. Generally, it is necessary to prepare various tools and materials like a scissor, a wire stripper, a soldering iron, a soldering iron support, a tin wire, a soldering flux, an electric screwdriver, a hot glue gun, a battery power-on tester, a lamp string power-on tester, two screws, a small cap of a battery box. Since tin soldering is required, it is also necessary to prepare a smoke exhaust facility for each station. Therefore, a conventional connecting structure of the existing LED lamp string and the battery box causes operations for overall working procedures of connections thereof to be rather complicated, in which case it is easy to cause an error. Repeated working procedures consume a large number of human labor cost and material cost. Meanwhile, upon tin soldering with an electric soldering iron, a small amount of harmful gas is generated, thereby causing a certain harm to health of workers in a long-term operation process. Meanwhile, 1%-2% defective products also exist due to the reason that in the process of welding the LED lamp string to a circuit board, the circuit board is mostly in a naked state, resulting in mis-welding or falling off of small parts on the circuit board and burning of a plastic housing by a high-temperature electric soldering iron, which further increase production cost for replacement and rework at a late stage.

In addition, the existing LED lamp string is of different qualities. Upon purchase, a consumer generally needs to confirm whether the LED lamp string works normally or not, whether a light emitting color is needed or not, and whether a LED lamp bead can be lighted on or not. However, the existing LED lamp string is generally a finished product and packaged well. If it is necessary to check whether the LED lamp string is in a good condition, whether it is consistent with the instructions on an outer package or whether its light emitting brightness is suitable or not and other demonstrating requirements, the consumer likely needs to open the package in a process of selection and demonstration or damage the product package. If the consumer gives up buying the opened product, resales of the product will be impacted.

In the prior art, especially a box with three AA batteries and a battery box in a rectangular arrangement structure, when two batteries are connected in series in one battery stack, if a pressing apparatus is absent, it is easy to pop the two batteries outside the battery stack. This is a very poor using experience. A conventional method is to press at least one battery with a large cover plate, causing a height of an entire battery box thereof relatively higher, resulting in waste of materials, increase of cost and complicated assembling.

Regarding the existing structure of the cover plate about the battery box, the cover plate is entirely fastened with the box body through a plurality of bolts, resulting in problems like excessive use of materials and repeated working procedures. In addition, the existing waterproof gasket of the battery box in a rectangular arrangement structure generally has a thickness thereof consistent. However, its sealing property is not good enough. This may affect rainproof performance of the battery box outdoors. In this case, rainproof failure appears likely.

SUMMARY

Regarding the existing problem in the prior art, the objective of the design in the present invention is to provide a battery box.

The present invention can be realized through the following technical solution:

a battery box, comprising a box body and an LED lamp string connected to the box body, wherein a circuit board mounting groove and a battery placement groove are disposed in the box body, a power supply source is disposed in the battery placement groove, and a circuit board and a cover plate are disposed in the circuit board mounting groove, characterized in that a power source terminal seat is disposed at one side of the circuit board, at least two terminal plugholes are disposed in the power source terminal seat, a through-line hole is disposed on a side wall of each of the terminal plugholes facing the box body, a collosol groove is between the through-line hole and the power source terminal seat, power source plug terminals are disposed at one end of the LED lamp string, and the power source plug terminals are correspondingly inserted into the terminal plugholes respectively.

The battery box is characterized in that there are two or three terminal plugholes arranged in a same group, two of the terminal plugholes in the same group are respectively connected to a power source positive electrode point and a power source negative electrode point on the circuit board, and the power source plug terminals are respectively two lamp bases on a LED bulb.

The battery box is characterized in that a partition is disposed between the circuit board mounting groove and the collosol groove.

The battery box is characterized in that the power supply source comprises a main power supply source and a demonstrating power supply source, the main power supply source and the demonstrating power supply source are both used for powering the LED lamp string, at least one switch is disposed on the circuit board, the switch is used for controlling on or off of the main power supply source and the demonstrating power supply source, or two switches are disposed on the circuit board, the two switches respectively and independently control on or off of the main power supply source and the demonstrating power supply source, a switch through hole is further disposed on the cover plate, and the switch through hole corresponds to the switch(es).

The battery box is characterized by further comprising a demonstrating power supply source mounting piece, wherein the demonstrating power supply source mounting piece is used for mounting the demonstrating power supply source and the demonstrating power supply source mounting piece is mounted on the circuit board.

The battery box is characterized in that an electrical contact terminal mounting base is disposed at a bottom of the cover plate, an electrical contact terminal is embedded in the electrical contact terminal mounting base, and after the cover plate and the circuit board mounting groove are fixed, the electrical contact terminal is conflict-fit with a power source contact end on the circuit board.

The battery box is characterized in that a clamping tongue is disposed at two ends of the cover plate respectively, a clamping groove is disposed on the circuit board mounting groove fitted with the clamping tongue, the cover plate and the circuit board mounting groove realize a clamping fit therebetween through a fit between the clamping tongue and the clamping groove, a limit block extending towards the battery placement groove is disposed at one side of the cover plate, a spacing of the limit block extending outside a side wall of the battery placement groove is at least greater than a distance of adjacent lateral spacings of the battery mounted in the battery placement groove and smaller than or equal to a distance of a horizontal plane radially extending to a spacing staggered with an outer circle of the battery, and a setting height of the limit block is greater than a center height of the battery in the battery placement groove and smaller than a diameter height of the battery.

The battery box is characterized in that an up-turning mechanism for opening an end portion of the cover plate is disposed at one end of the cover plate close to the through-line hole, the up-turning mechanism splits the cover plate into a movable plate and a fixed plate, the up-turning mechanism is a bending groove which is disposed at a lower side surface of the cover plate and penetrates two ends of the cover plate in a width direction, the bending groove is located between the movable plate and the fixed plate, the bending groove, the movable plate and the fixed plate are an integral structure, and the fixed plate and the circuit board mounting groove are tightened with a bolt.

The battery box is characterized in that the battery box further comprises a cover body, one side of the cover body and the box body are disposed hingedly, the other side of the cover body is clamped to the box body through a clamping button, a waterproof gasket is disposed between the cover body and the box body, and a thickness dimension of the waterproof gasket at two ends is greater than a thickness dimension in the middle of the waterproof gasket.

The battery box is characterized in that the two ends of the waterproof gasket start to thicken gradually from a curved arm position of the button at an angle of 0.5-5 degrees; there are three clamping buttons located at the middle and two sides respectively, and the clamping buttons located at the two sides respectively have a fastener extending therefrom for making snap-fit of the cover body more stable.

The present invention has advantages in convenient processing and assembly, high production efficiency, no harm caused, low manufacturing cost and avoiding waste of resources. In addition, the up-turning mechanism is disposed to thus realize up bending of the movable plate, to facilitate performing of a dispensing working procedure and to simplify assembling working procedures. The improvement of the waterproof gasket can effectively fill an opening space generated by warping two ends of the cover body, to realize a better sealing effect. The improvement of the clamping buttons makes fit of the cover body, the box body and the waterproof gasket more fitting and make snap-fit more solid and stable.

DESCRIPTION OF THE EMBODIMENTS

The present invention is further described in detail below with reference to the accompanying drawings of the description, and specific embodiments are provided.

Embodiment 1

Figure 1:
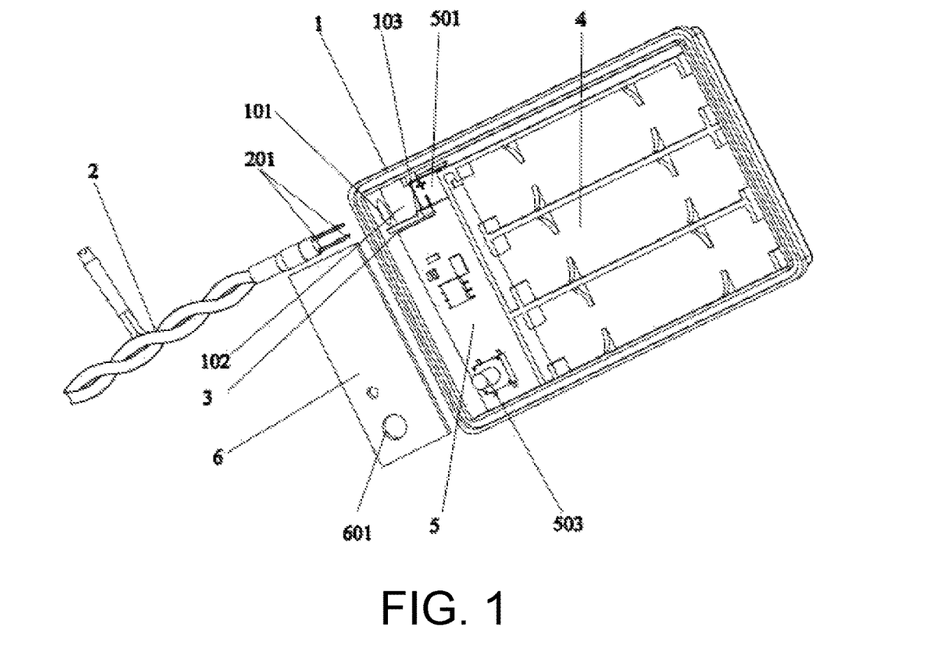
FIG. 1 is a schematic diagram of an overall decomposition structure according to embodiment 1 of the present invention.
Figure 2:
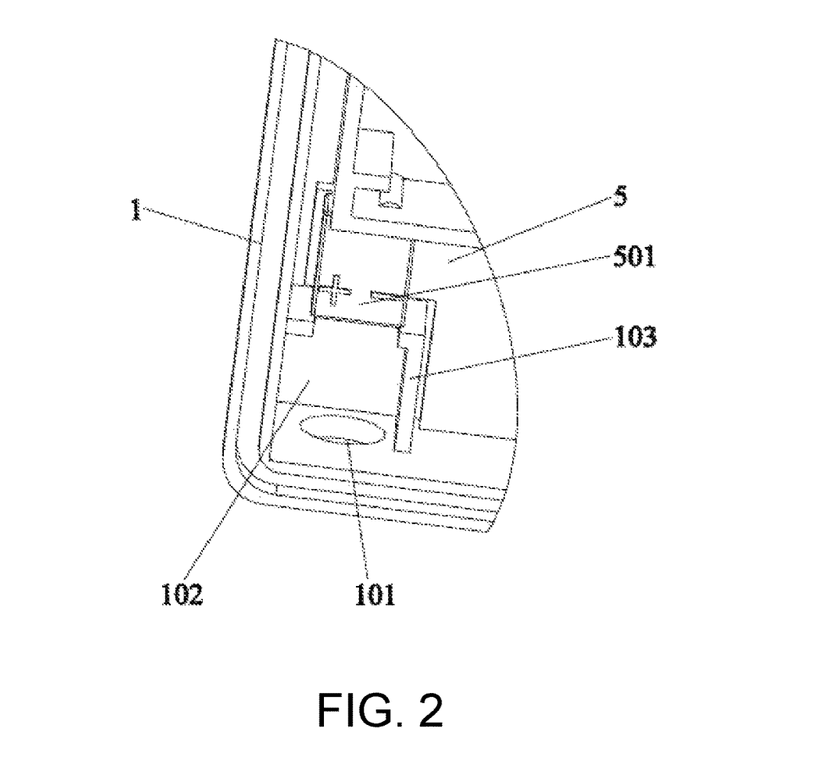
FIG. 2 is an enlarged structural diagram of a power source terminal seat and a box body mounting position of FIG. 1.
Figure 3:
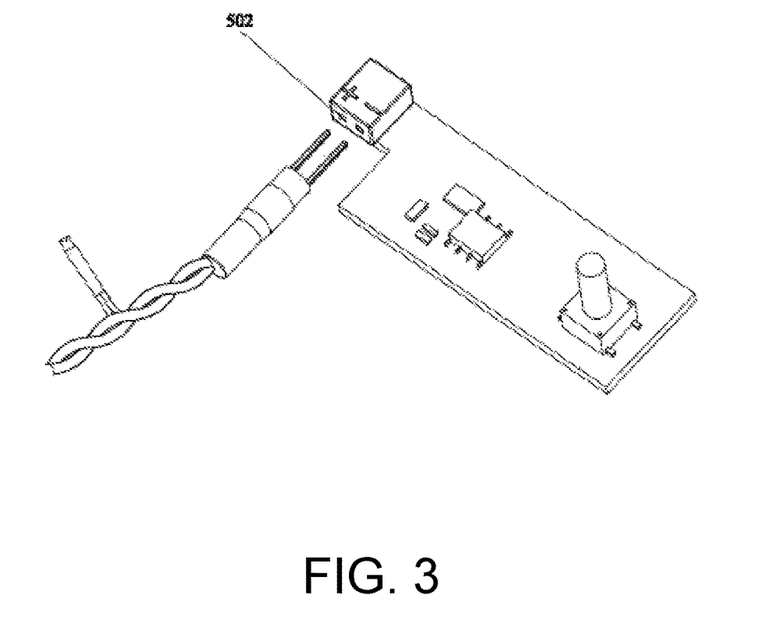
FIG. 3 is a schematic diagram of a decomposition structure of a circuit board and an LED lamp string of FIG. 1.
Figure 4:
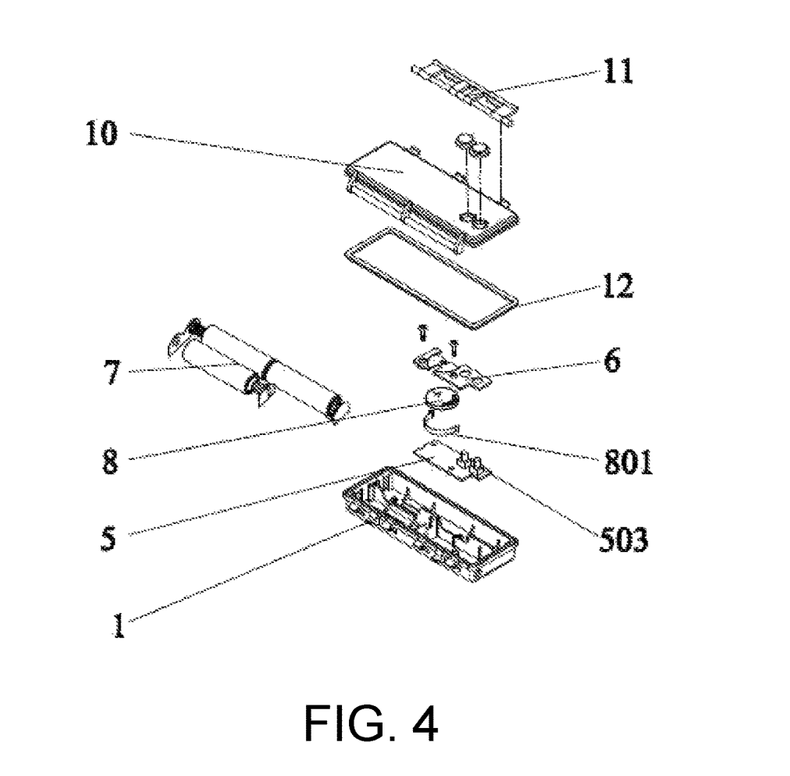
FIG. 4 is a schematic diagram of an overall decomposition structure according to embodiment 2 of the present invention.
Figure 5:
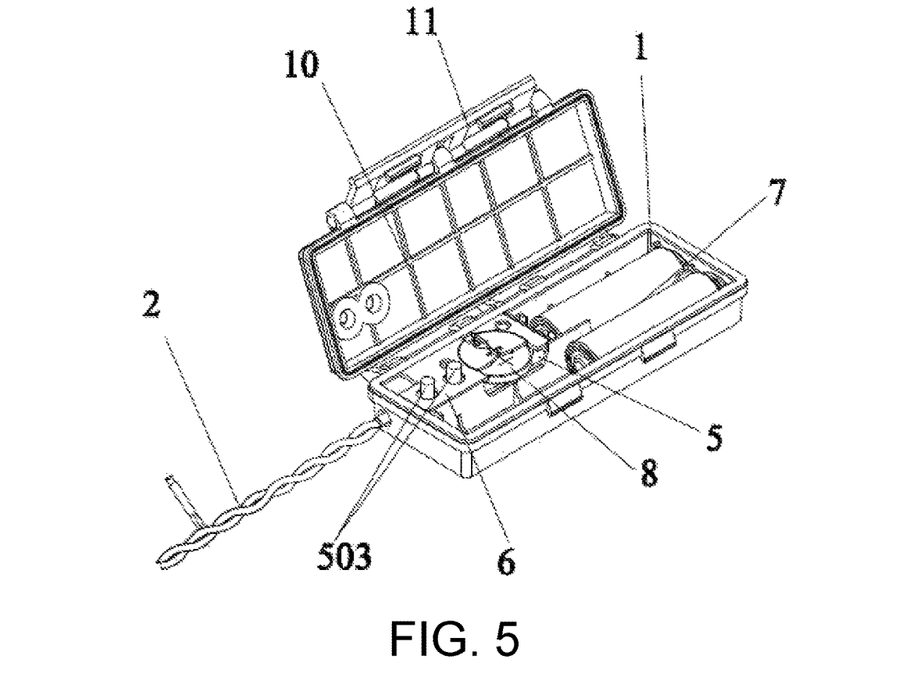
FIG. 5 is a schematic diagram of an entire mounting structure of the FIG. 1.
Figure 6:
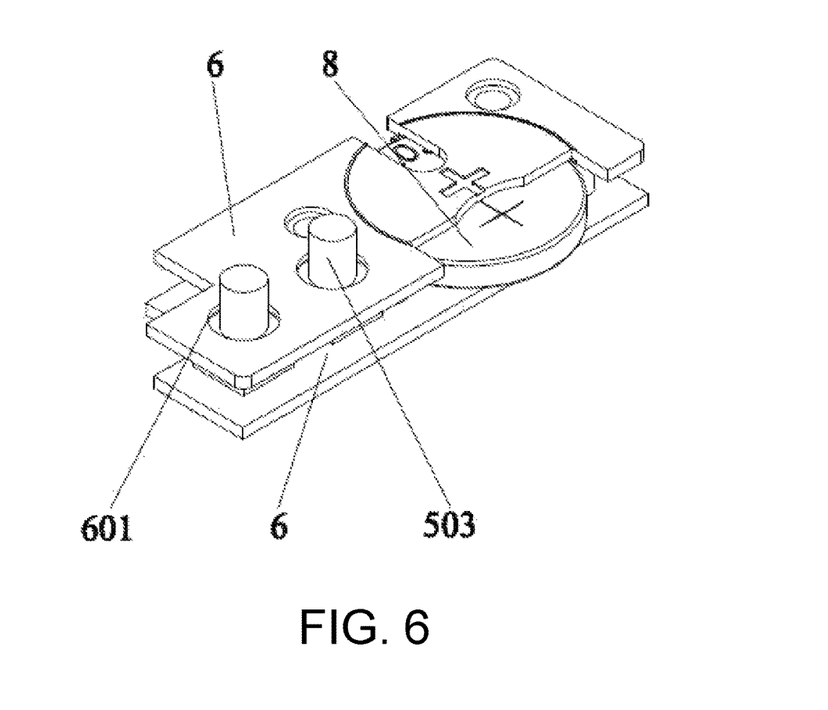
FIG. 6 is a schematic diagram of a mounting structure of a circuit board, a cover plate, and a demonstrating power supply source in embodiment 2.

As shown in FIGS. 1-3, the present invention relates to a battery box, comprising a box body 1 and an LED lamp string 2 connected to the box body 1, wherein a circuit board mounting groove 3 and a battery placement groove 4 are disposed in the box body 1, a power supply source is disposed in the battery placement groove 4, and a circuit board 5 and a cover plate 6 are disposed in the circuit board mounting groove 3, wherein a power source terminal seat 501 is disposed at one side of the circuit board 5, at least two terminal plugholes 502 are disposed in the power source terminal seat 501, a through-line hole 101 is disposed on a side wall of each of the terminal plugholes 502 facing the box body 1, a collosol groove 102 is between the through-line hole 101 and the power source terminal seat 501, power source plug terminals 201 are disposed at one end of the LED lamp string 2, and the power source plug terminals (201) are correspondingly inserted into the terminal plugholes 502 respectively. There are two or three terminal plugholes 502 arranged in a same group, two of the terminal plugholes 502 in the same group are respectively connected to a power source positive electrode point and a power source negative electrode point on the circuit board 5, and the power source plug terminals 201 are respectively two lamp bases on a LED bulb. A partition 103 is disposed between the circuit board mounting groove 3 and the collosol groove 102.

In the embodiment, the two power source plug terminals 201 are respectively two lamp bases on an LED bulb. The design is suitable for manufacturing of an LED lamp string 2, as it is only necessary to use an automatic welding machine to weld one LED bulb again for a wire end at a tail end of the LED lamp string 2 upon manufacturing the existing LED lamp string 2, in which case manufacturing of the power source plug terminals 201 can be rapidly completed. Upon mounting plugholes for the power supply plug terminals 201 and the terminal plugholes 502, it is only necessary to use a scissor to shear a bulb head of the LED bulb. Wherein, the power source plug terminals 201 have a length dimension of 3 mm-10 mm, and a preferable length dimension of 5 mm-7 mm. If three terminal plugholes 502 are employed and arranged in a same group, any two terminal plugholes 502 among the three terminal plugholes 502 are respectively connected to a power source positive electrode point and a power source negative electrode point on the circuit board 5 and another terminal plughole 502 can configure an output mode according to an actual situation.

In the embodiment, the circuit board mounting groove 3 disposed in the box body 1 is used for embedding the circuit board 5, and the cover plate 6 is fit-mounted at an upper part of the circuit board 5, and the cover plate 6 is mounted on the circuit board 5, after which fixing can be directly completed, thereby avoiding a subsequent working procedure for capping in the prior art. Moreover, internal elements of the circuit board 5 can be protected during early capping and a damage caused in a subsequent transportation or processing procedure is avoided.

Embodiment 2

As shown in FIGS. 4-9, the embodiment mainly differs from embodiment 1 in that the power supply source comprises a main power supply source 7 and a demonstrating power supply source 8, the main power supply source 7 and the demonstrating power supply source 8 are both used for powering the LED lamp string 2, at least one switch 503 is disposed on the circuit board 5, the switch 503 is used for controlling on or off of the main power supply source 7 and the demonstrating power supply source 8, or two switches 503 are disposed on the circuit board 5, the two switches 503 respectively and independently control on or off of the main power supply source 7 and the demonstrating power supply source 8, a switch through hole 601 is further disposed on the cover plate 6, and the switch through hole 61 corresponds to the switch(es) 503. In the embodiment, the battery box further comprises a a demonstrating power supply source mounting piece 801, wherein the demonstrating power supply source mounting piece 801 is used for mounting the demonstrating power supply source 8 and the demonstrating power supply source mounting piece 801 is mounted on the circuit board 5.

In the embodiment, the main power supply source 7 employs a battery pack preferably. The battery pack comprises at least one battery. The number of batteries is decided according to a power supply amount of the battery box and generally there are three batteries. Meanwhile, the battery pack can also employ a lithium battery plate and other existing batteries with a large electric quantity. A battery placement groove 4 for mounting the main power supply source 7 is disposed in the battery box body. The battery placement groove 4 is designed in a shape corresponding to the battery of different specifications or types selected by the main power supply source 7, without being restricted to the shape and the arrangement structure in the accompanying drawing. In an actual production process, regarding the battery placement groove in the batter box body, when the battery pack preferably serves as the main power supply source, a single mounting groove of the battery in the battery placement groove 4 is disposed side by side or not side by side.

The main power supply source 7 powers the LED lamp string 2 through the circuit board 5. A control circuit is disposed in the circuit board 5. The control circuit is specifically designed by employing a commonly used control circuit in the prior art. Through the control circuit combined with the switch, lighting on, fast blinking, blinking at an interval, lighting off and other functions can be realized. The above functions are commonly used in the existing LED lamp string 2. Meanwhile, the design of the control circuit in the circuit board 5 does not belong to the protection scope required by the application documents of our side. The realization of the above functions can be fully completed through the prior art. Therefore, the specific structure relating to the control circuit is not described herein any longer in details.

The demonstrating power supply source 8 functions to power temporarily upon purchasing a product by a consumer, thus lighting on for observation. What is preferably used is a button battery and the preferable model is CR2032. Due to small volume of the button battery, it is convenient for its combination and mounting into the battery box.

The demonstrating power supply source 8 can be combined into the circuit board 5. By combination with the control circuit, one switch 503 can be shared with the main power supply source 7 to realize lighting on. By setting the switch 503 for different operations, output of different signals is realized. As commonly used in the prior art, output of different controls can be completed through short press, long press, and according to the number of continuous pressing times and this can be completely implemented through the prior art.

The demonstrating power supply source 8 can also be directly connected to a positive wire and a negative wire in the LED lamp string 2. By additionally setting a switch which is controlled independently, the demonstrating power supply source 8 can be turned on or off independently, avoiding forming an interference with the main power supply source 7. The structure has low requirements on the control circuit in the circuit board 5, which is realized more conveniently.

Figure 7:
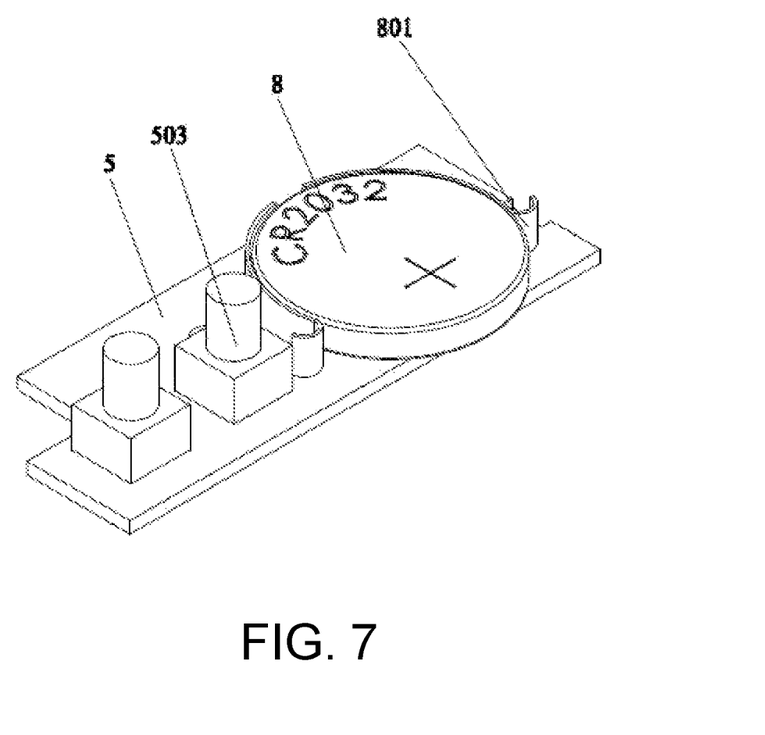
FIG. 7 is a schematic diagram of a mounting structure of a demonstrating power supply source.
Figure 8:
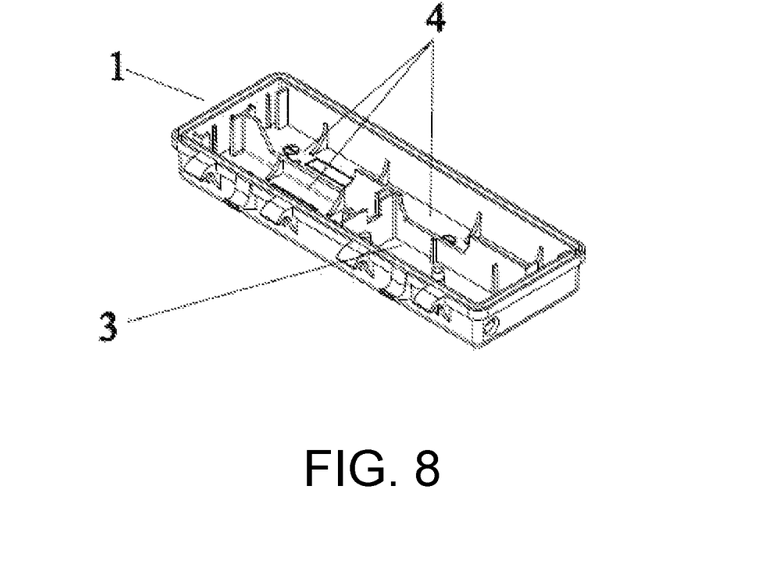
FIGS. 8-9 are a structural diagram of a box body.
Figure 9:
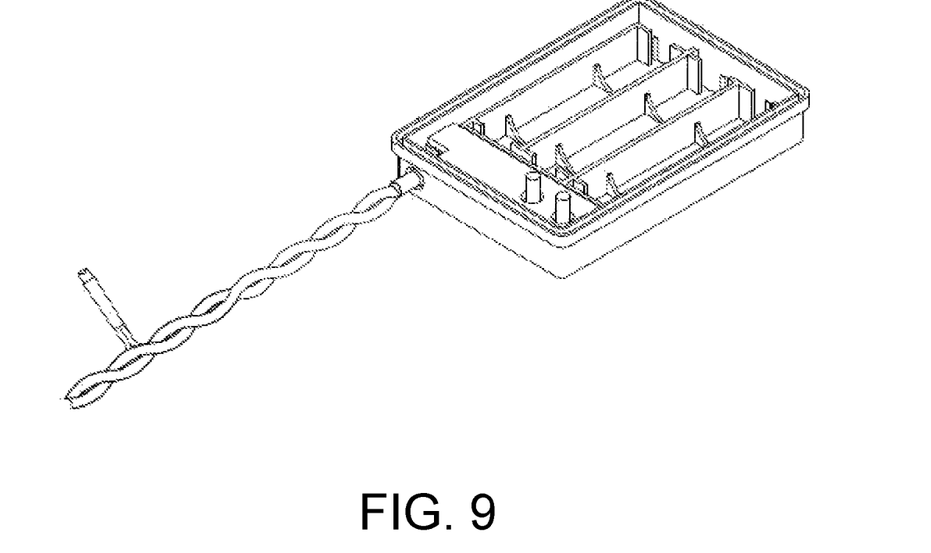

Further, the present invention further comprises a demonstrating power supply source mounting piece 801, wherein the demonstrating power supply source mounting piece 801 is used for mounting the demonstrating power supply source 8 and the demonstrating power supply source mounting piece 801 is mounted on the circuit board 5. The demonstrating power supply source mounting piece 801 is located under the cover plate 6, the cover plate 6 covers an upper part of the demonstrating power supply source 8. The demonstrating power supply source mounting piece 801 preferably employs an elastic clamping spring structure and simultaneously a metal elastic clamping spring structure preferably, which can be a positive electrode contact piece to facilitate circuit connection. Meanwhile, an internal cavity facilitates clamping of the demonstrating power supply source 8 to improve mounting convenience.

Further, the battery box of the present invention further comprises a cover body 10, one side of the cover body 10 and the box body 1 are disposed hingedly, the other side of the cover body 10 is clamped to the box body 1 through a clamping button 11, and a waterproof gasket 12 is disposed between the cover body 10 and the box body 1. The embodiment employs a design of a mounting structure for a box of dual power sources, to facilitate lighting on of the LED lamp string for demonstration and effectively solve the waterproof problem of the demonstrating power source, and avoid causing an effect on an outer package. Meanwhile, the production cost is also lowered and waste of resources is avoided.

Embodiment 3

As shown in FIGS. 10-17, the design point of the embodiment lies in that an electrical contact terminal mounting base 602 is disposed at a bottom of the cover plate 6, an electrical contact terminal 603 is embedded in the electrical contact terminal mounting base 602, and after the cover plate 6 and the circuit board mounting groove 3 are fixed, the electrical contact terminal 603 is conflict-fit with a power source contact end on the circuit board 5, so as to realize an electrical connection between the electrical contact terminal 603 and the circuit board 5. After the cover plate 6 and the circuit board mounting groove 3 are fixed, the electrical contact terminal 603 is conflict-fit with a power source contact end on the circuit board 5. A clamping tongue 604 is disposed at two ends of the cover plate 6 respectively, a clamping groove 104 is disposed on the circuit board mounting groove 3 fitted with the clamping tongue 604, the cover plate 6 and the circuit board mounting groove 3 realize a clamping fit therebetween through a fit between the clamping tongue 604 and the clamping groove 104, a limit block 605 extending towards the battery placement groove 4 is disposed at one side of the cover plate 6, a spacing of the limit block 605 extending outside a side wall of the battery placement groove 4 is at least greater than a distance of adjacent lateral spacings of the battery mounted in the battery placement groove 4 and smaller than or equal to a distance of a horizontal plane radially extending to a spacing staggered with the battery, and a setting height of the limit block 605 is greater than a center height of the battery in the battery placement groove 4 and smaller than a diameter height of the battery.

Figure 11:
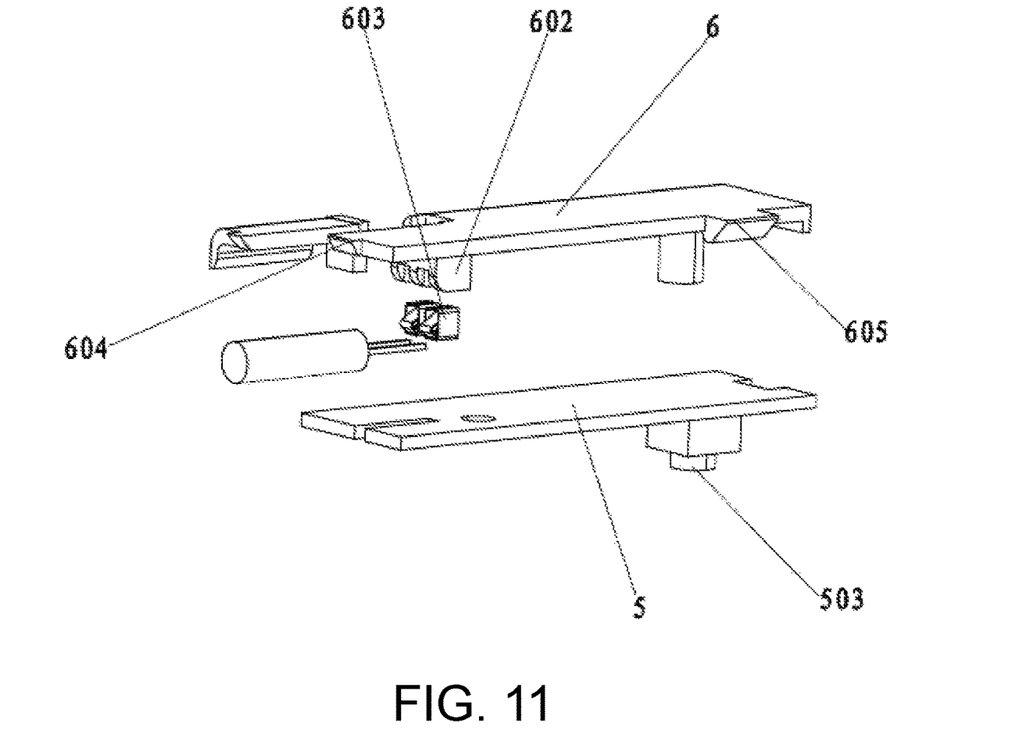
FIG. 11 is a schematic diagram of a decomposition structure of a cover plate and a circuit board in embodiment 3.
Figure 12:
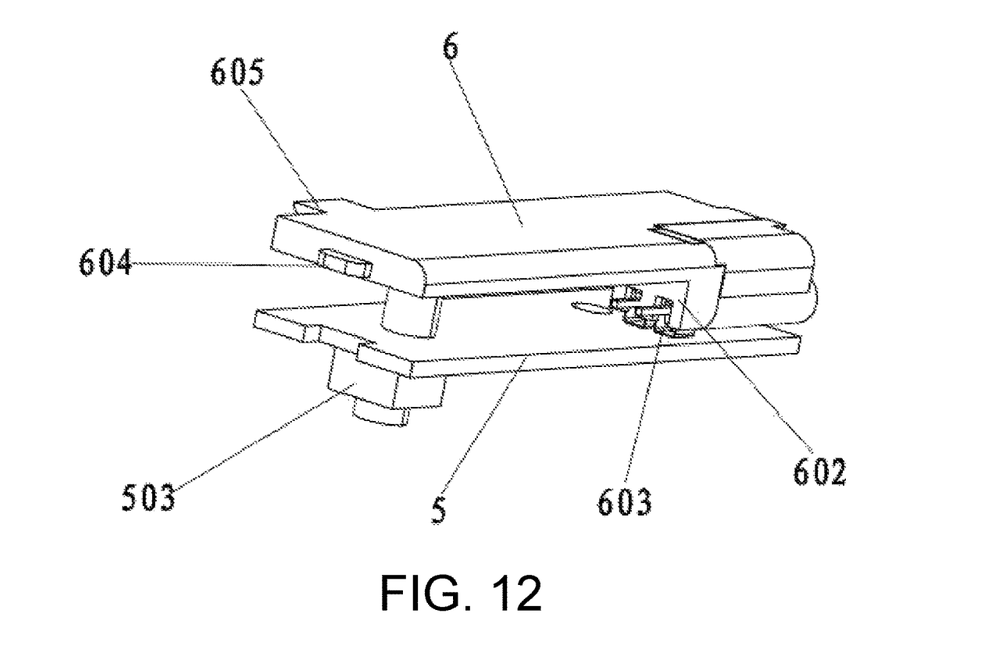
FIG. 12 is a structural diagram of a cover plate and a circuit board in embodiment 3.

There are a pair of electrical contact terminals 603, which are respectively connected to a power source positive electrode point and a power source negative electrode point on the circuit board 5. As a preferable structure, the electrical contact terminal 603 is an elastic electrical contact terminal, comprising a clip inside. After a pin of a lamp base plug is inserted into the electrical contact terminal 603, the pin of the lamp base plug can be clamped and an electrical connection can be realized. After the above structure is employed, the lamp base plug of the LED lamp string 2 is plug-fit with the electrical contact terminal 603 after entering an access opening of the lamp base plug of the LED lamp string, so as to realize an electrical connection between the LED lamp string 2 and the circuit board 5, resulting in convenient mounting and effective and reliable connection.

Figure 10:
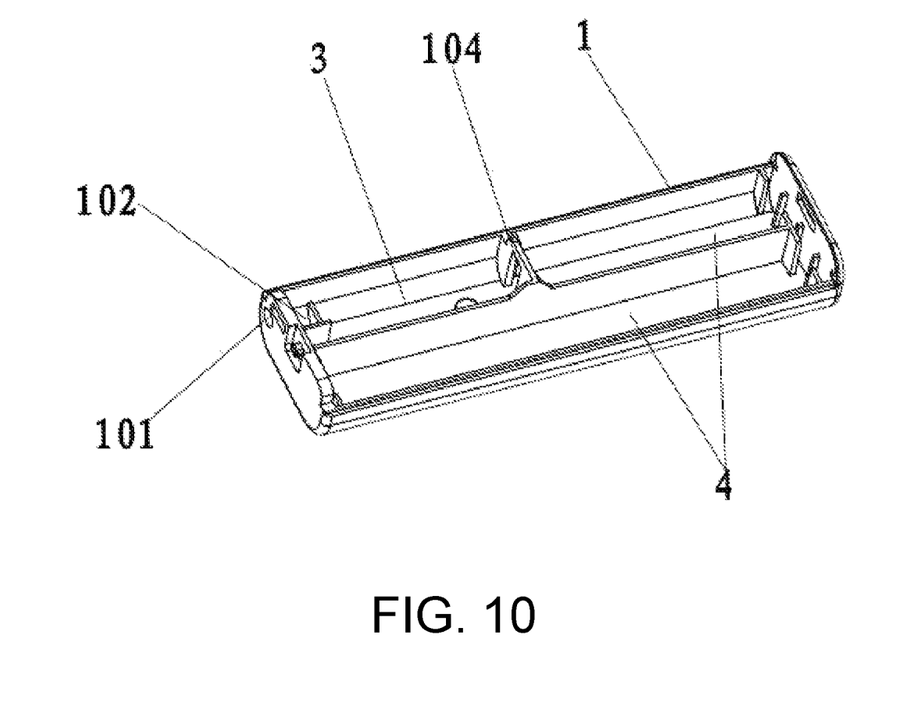
FIG. 10 is a structural diagram of a box body in embodiment 3.

In the embodiment, in order to facilitate the exterior to control the battery box, a switch through hole is disposed at a bottom of the box body 1 and a switch 503 is disposed on the circuit board 5. The switch 503 is preferably a pressing switch and a lower end of the switch 503 penetrates the switch through hole 601 for being exposed outside the box body 1.

In the embodiment, a clamping fit manner is employed between the cover plate 6 and the circuit board mounting groove 3 for fixing. That is, a clamping tongue 604 is disposed at two ends of the cover plate 6 respectively, a clamping groove 104 is disposed on the circuit board mounting groove 3 fitted with the clamping tongue 604, and the cover plate 6 and the circuit board mounting groove 3 realize a clamping fit therebetween through a fit between the clamping tongue 604 and the clamping groove 104.

Figure 13:
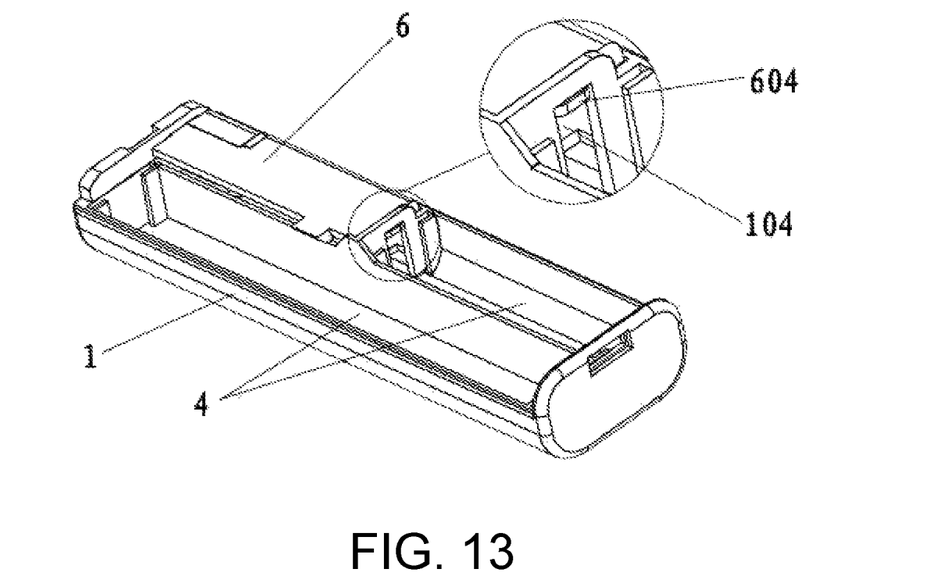
FIG. 13 is a schematic diagram of a connecting structure of an LED lamp string and a battery box in embodiment 3.
Figure 14:
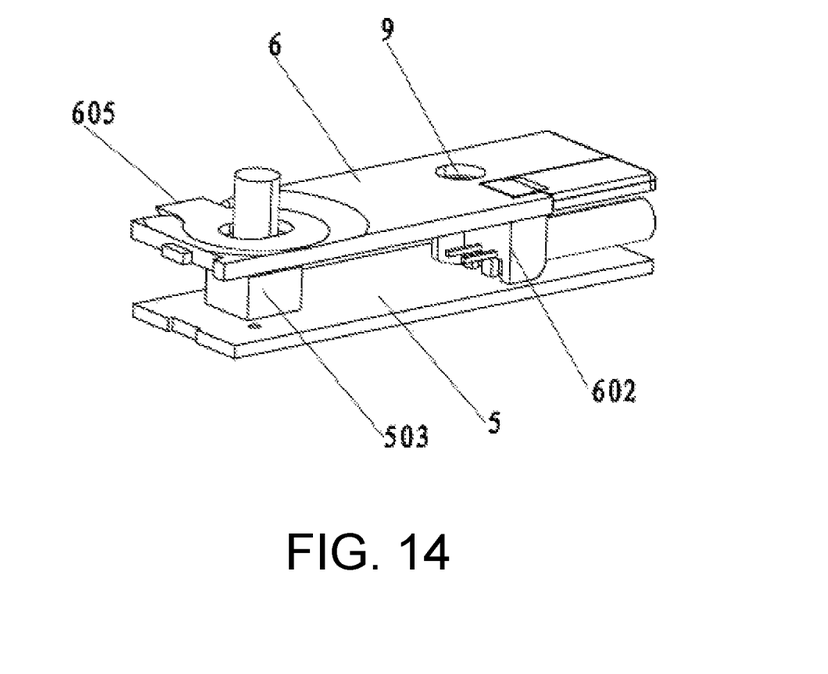
FIG. 14 is a schematic diagram of another mounting structure of a cover plate and a circuit board in embodiment 3.

In the embodiment, in order to further fix the LED lamp string 2, a collosol groove 102 is disposed between the circuit board mounting groove 3 and the access opening of the lamp base plug of the LED lamp string 2. The hot collosol groove 102 is used for injecting hot collosol or other sealant to realize fixing of the lamp base plug.

Figure 15:
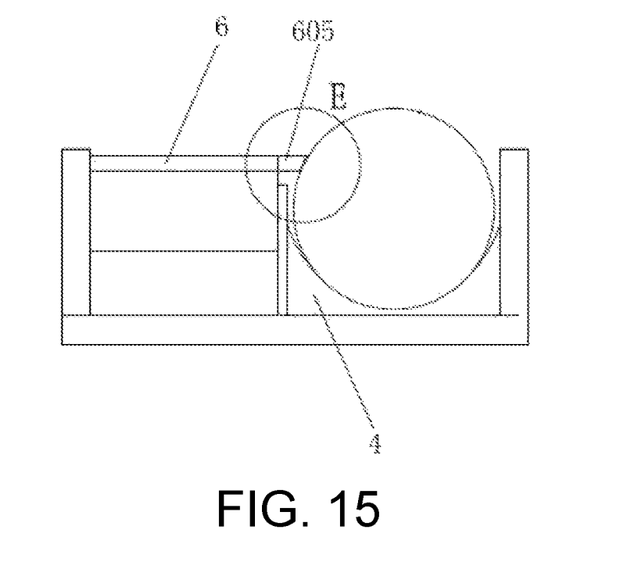
FIG. 15 is a structural diagram of a fit between a limit block and a battery in embodiment 3.
Figure 16:
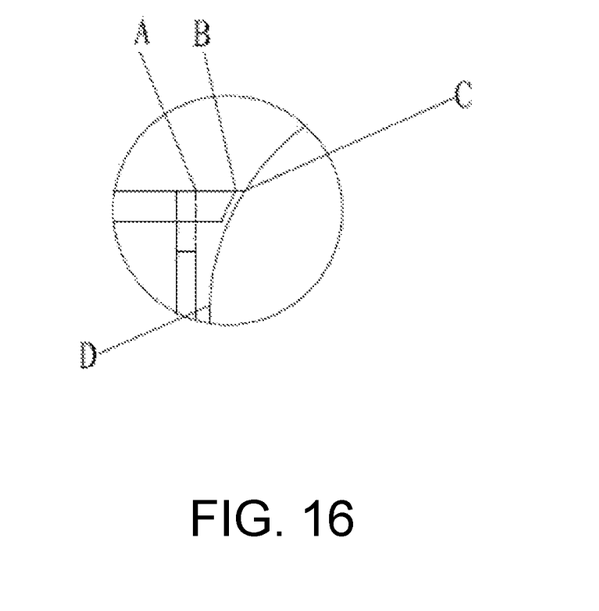
FIG. 16 is an enlarged view of position E in FIG. 15.
Figure 17:
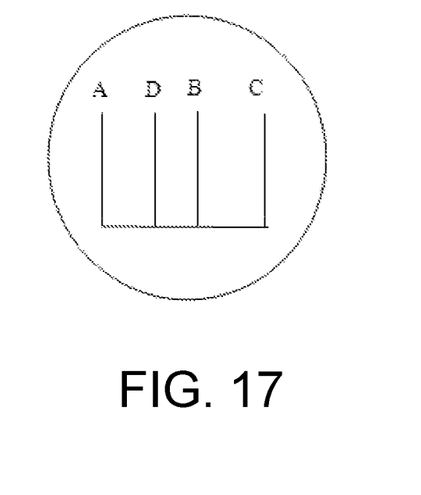
FIG. 17 is a schematic diagram of a position corresponding to a level at endpoints A, B, C and D in FIG. 16.
Figure 18:
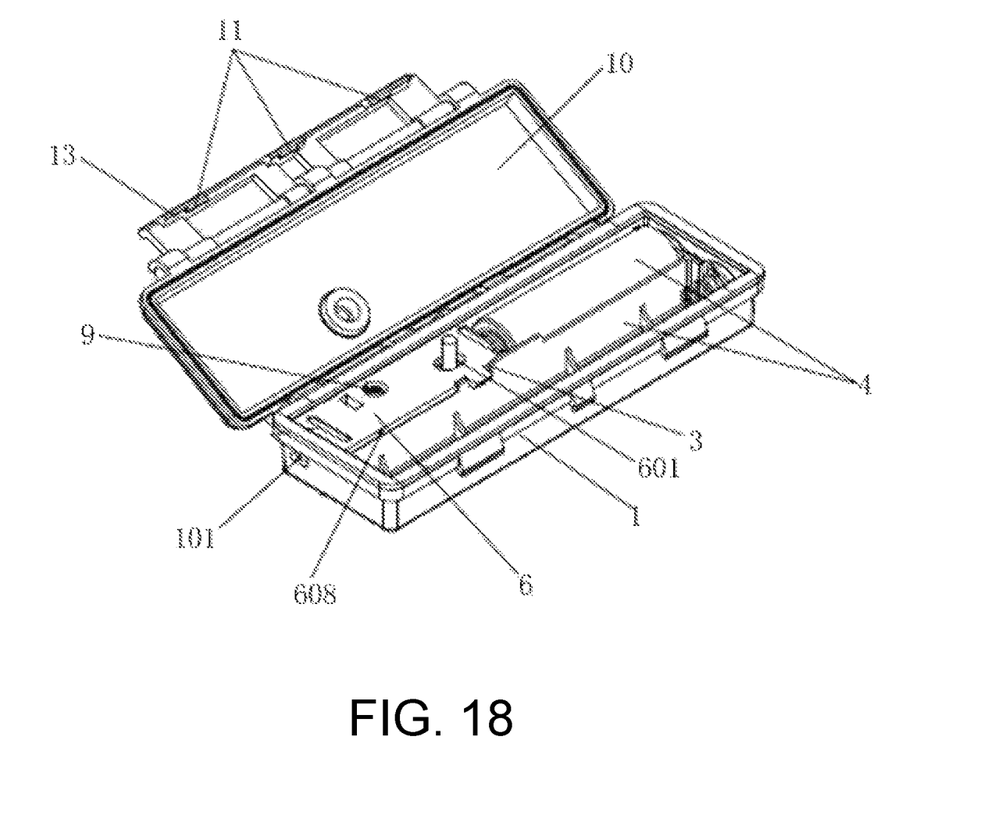
FIG. 18 is a schematic diagram of an overall structure in embodiment 4.

In the embodiment, in order to realize fixing of the battery in the battery placement groove 4, a limit block 605 extending towards the battery placement groove 4 is disposed at one side of the cover plate 6. As a preferable structure, a spacing of the limit block 605 extending outside a side wall of the battery placement groove 4 is at least greater than a distance of adjacent lateral spacings of the battery mounted in the battery placement groove 4 and smaller than or equal to a distance of a horizontal plane radially extending to a spacing staggered with the battery.

As a preferable structure, a spacing of the limit block 605 extending outside a side wall of the battery placement groove 4 is at least greater than a distance between the battery mounted in the battery placement groove 4 and a side wall of the battery placement groove 4, and smaller than or equal to a distance of a horizontal plane where the limit block 605 is located radially extending to the battery and intersecting the battery. With FIGS. 16 and 17 as an example, an intersecting point of the side wall of the battery placement groove 4 and the limit block 605 is A, an extending endpoint of the limit block 605 is B, a point of a horizontal plane where the limit block 605 is located, radially extending to the battery, and intersecting the battery is C, an outermost side wall endpoint of the battery is D, and a distance of AB is greater than a distance of AD and smaller than a distance of AC.

Embodiment 4

As shown in FIGS. 18-22, the main point of the embodiment lies in that an up-turning mechanism for opening an end portion of the cover plate 6 is disposed at one end of the cover plate 6 close to the through-line hole 101, the up-turning mechanism splits the cover plate 6 into a movable plate 606 and a fixed plate 607, the up-turning mechanism is a bending groove 608 which is disposed at a lower side surface of the cover plate (6) and penetrates two ends of the cover plate 6 in a width direction, the bending groove 608 is located between the movable plate 606 and the fixed plate 607, the bending groove 608, the movable plate 606 and the fixed plate 607 are an integral structure, and the fixed plate 607 and the circuit board mounting groove 3 are tightened with a bolt 9.

Figure 19:
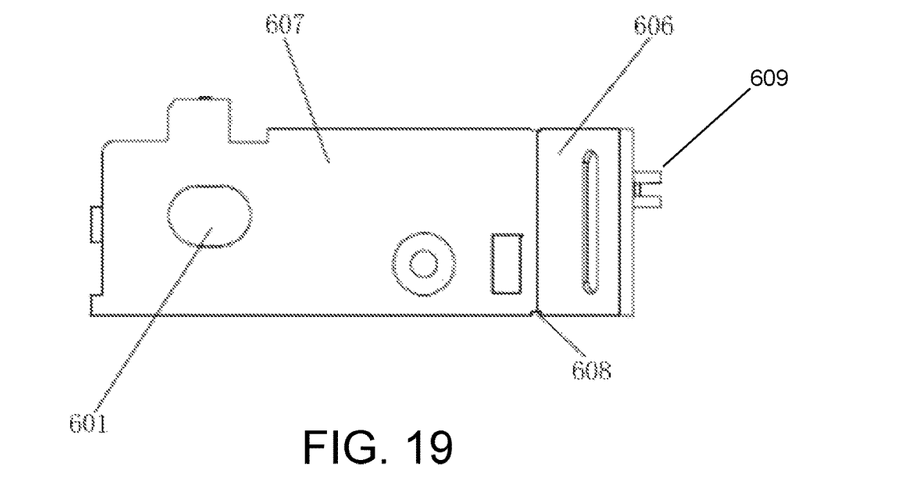
FIG. 19 is a schematic diagram of a top-view structure of a cover plate in embodiment 4.
Figure 20:
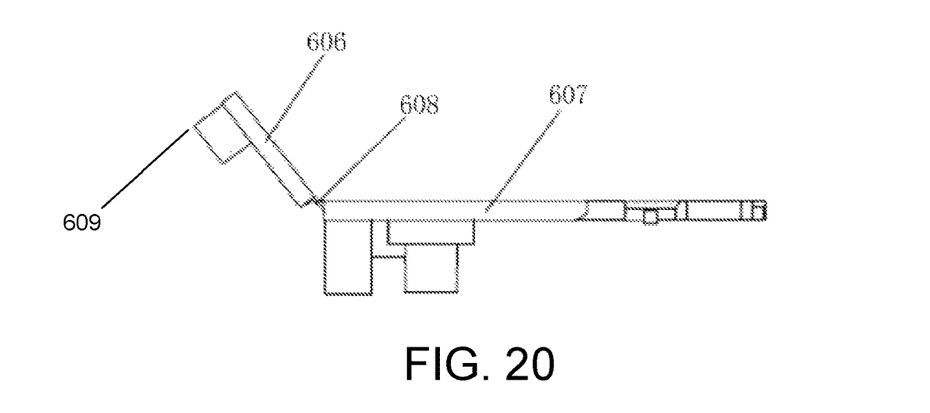
FIG. 20 is a structural diagram of a process for up-bending a movable plate in embodiment 4.

Preferably, the clamping groove 609 and the partition 103 on the movable plate 606 employ a clamping structure, thus enabling the cover plate 6 and the box body 1 to be fixed without the aid of an external force when the bolt 9 is not mounted. This facilitates solution of the problem about easy separation of the cover plate 6 and the box body 1 caused by not mounting the screw or the bolt fixedly etc. in the prior art. Upon assembling with the technical solution of our side, an additional fixture or human labor is not required any longer for fixing, as parts can be pre-fitted independently, so as to effectively lower difficulties in the assembling working procedure.

Figure 21:
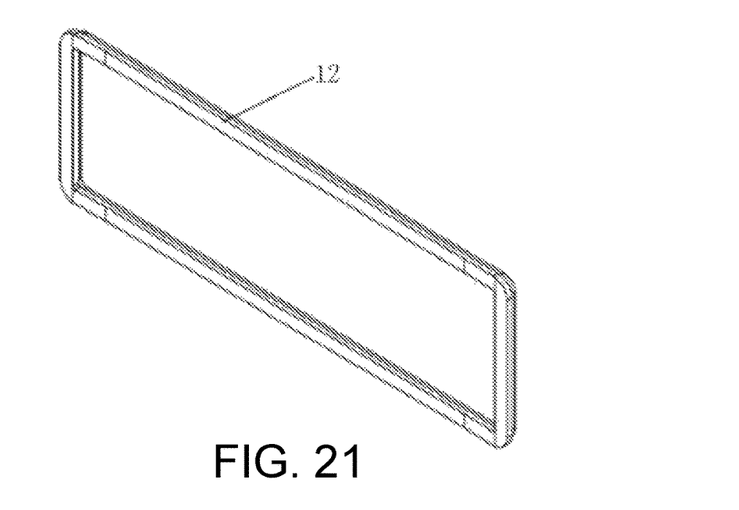
FIG. 21 is a structural diagram of a waterproof gasket.
Figure 22:
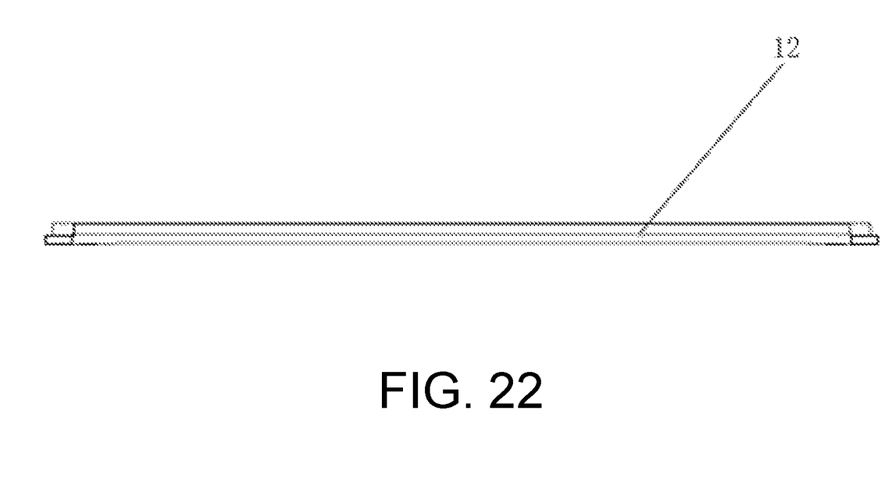
FIG. 22 is a side view of a waterproof gasket.

The battery box further comprises a cover body 10, one side of the cover body 10 and the box body 1 are disposed hingedly, the other side of the cover body 10 is clamped to the box body 1 through a clamping button 11, a waterproof gasket 12 is disposed between the cover body 10 and the box body 1, and a thickness dimension of the waterproof gasket 12 at two ends is greater than a thickness dimension in the middle of the waterproof gasket. The two ends of the waterproof gasket 12 start to thicken gradually from a curved arm position of the button at an angle of 0.5-5 degrees; there are three clamping buttons 11 located at the middle and two sides respectively, and the clamping buttons 11 located at the two sides respectively have a fastener 13 extending therefrom for making snap-fit of the cover body 10 more stable.

What is claimed is:

1. A battery box, comprising a box body and an LED lamp string connected to the box body, wherein a circuit board mounting groove and a battery placement groove are disposed in the box body, a power supply source is disposed in the battery placement groove, and a circuit board and a cover plate are disposed in the circuit board mounting groove, wherein a power source terminal seat is disposed at one side of the circuit board, at least two terminal plugholes are disposed in the power source terminal seat, a through-line hole is disposed on a side wall of each of the terminal plugholes facing the box body, a collosol groove is between the through-line hole and the power source terminal seat, power source plug terminals are disposed at one end of the LED lamp string, and the power source plug terminals are correspondingly inserted into the terminal plugholes respectively, wherein a clamping tongue is disposed at two ends of the cover plate respectively, a clamping groove is disposed on the circuit board mounting groove fitted with the clamping tongue, the cover plate and the circuit board mounting groove realize a clamping fit therebetween through a fit between the clamping tongue and the clamping groove, a limit block extending towards the battery placement groove is disposed at one side of the cover plate, a spacing of the limit block extending outside a side wall of the battery placement groove is at least greater than a distance of adjacent lateral spacings of the battery mounted in the battery placement groove and smaller than or equal to a distance of a horizontal plane radially extending to a spacing staggered with an outer circle of the battery, and a setting height of the limit block is greater than a center height of the battery in the battery placement groove and smaller than a diameter height of the battery.

2. The battery box according to claim 1, wherein there are two or three terminal plugholes arranged in a same group, two of the terminal plugholes in the same group are respectively connected to a power source positive electrode point and a power source negative electrode point on the circuit board, and the power source plug terminals are respectively two lamp bases on a LED bulb.

3. The battery box according to claim 1, wherein a partition is disposed between the circuit board mounting groove and the collosol groove.

4. The battery box according to claim 1, wherein the power supply source comprises a main power supply source and a demonstrating power supply source, the main power supply source and the demonstrating power supply source are both used for powering the LED lamp string, at least one switch is disposed on the circuit board, the switch is used for controlling on or off of the main power supply source and the demonstrating power supply source, or two switches are disposed on the circuit board, the two switches respectively and independently control on or off of the main power supply source and the demonstrating power supply source, a switch through hole is further disposed on the cover plate, and the switch through hole corresponds to the switch.

5. The battery box according to claim 4, further comprising a demonstrating power supply source mounting piece, wherein the demonstrating power supply source mounting piece is used for mounting the demonstrating power supply source and the demonstrating power supply source mounting piece is mounted on the circuit board.

6. The battery box according to claim 1, wherein an electrical contact terminal mounting base is disposed at a bottom of the cover plate, an electrical contact terminal is embedded in the electrical contact terminal mounting base, and after the cover plate and the circuit board mounting groove are fixed, the electrical contact terminal is conflict-fit with a power source contact end on the circuit board.

7. The battery box according to claim 1, wherein an up-turning mechanism for opening an end portion of the cover plate is disposed at one end of the cover plate close to the through-line hole, the up-turning mechanism splits the cover plate into a movable plate and a fixed plate, the up-turning mechanism is a bending groove which is disposed at a lower side surface of the cover plate and penetrates two ends of the cover plate in a width direction, the bending groove is located between the movable plate and the fixed plate, the bending groove, the movable plate and the fixed plate are an integral structure, and the fixed plate and the circuit board mounting groove are tightened with a bolt.

8. The battery box according to claim 1, wherein the battery box further comprises a cover body, one side of the cover body and the box body are disposed hingedly, the other side of the cover body is clamped to the box body through a clamping button, a waterproof gasket is disposed between the cover body and the box body, and a thickness dimension of the waterproof gasket at two ends is greater than a thickness dimension in the middle of the waterproof gasket.

9. The battery box according to claim 8, wherein the two ends of the waterproof gasket start to thicken gradually from a curved arm position of the clamping button at an angle of 0.5-5 degrees; there are three or four clamping buttons located at the middle and two sides respectively, and the clamping buttons located at the two sides respectively have a fastener extending therefrom for making snap-fit of the cover body more stable.

\* \* \* \* \*